United States Patent [19]

McLoughlin

[11] Patent Number: 5,467,827
[45] Date of Patent: Nov. 21, 1995

[54] MODULAR FIRE TRUCK

[76] Inventor: John E. McLoughlin, 26 Southern Blvd., Nesconset, N.Y. 11767

[21] Appl. No.: 123,796

[22] Filed: Sep. 20, 1993

[51] Int. Cl.⁶ .................................................. A62C 27/00
[52] U.S. Cl. ........................... 169/24; 137/355.17; 193/5; 239/279; 239/289; 280/4; 280/782; 280/838; 414/495; 414/499; 414/531; 414/535; 414/550
[58] Field of Search ................................. 169/52, 24, 25; 296/35.3, 196, 197; 280/4, 782, 783, 798, 830, 838, 839; 414/501, 530, 531, 532, 535, 536, 543, 550, 398, 495, 498, 499, 523, 529; 239/175, 279, 284; 248/286, 309.1; 182/88, 98, 129, 214

[56] References Cited

U.S. PATENT DOCUMENTS

| | | | |
|---|---|---|---|
| 2,325,355 | 7/1943 | Yost | 280/838 X |
| 3,011,665 | 12/1961 | Wise | 414/535 |
| 3,493,053 | 2/1970 | Triplett | 169/24 |
| 3,770,060 | 11/1973 | Forsyth et al. | 169/24 |
| 4,227,843 | 10/1980 | Damm | 296/35.3 X |
| 4,830,421 | 5/1989 | Hawelka et al. | 169/24 X |
| 4,860,854 | 8/1989 | Lodholz, Jr. | 182/88 |

FOREIGN PATENT DOCUMENTS

| | | | |
|---|---|---|---|
| 2573372 | 5/1986 | France | 414/535 |
| 610205 | 4/1979 | Switzerland | 169/24 |

*Primary Examiner*—Andrew C. Pike
*Attorney, Agent, or Firm*—Louise S. Heim

[57] ABSTRACT

A fire truck having a flat bed includes a conveyor system for loading a number of interchangeable firefighting modules onto the bed. The conveyor system comprises a frame carrying a number of rollers or casters which allow the units to be easily slid on and off the bed. A pneumatic, hydraulic, electric, or mechanical mechanism is provided for raising and lowering the roller frame to engage or disengage the flat bottoms of the firefighting modules. Among the various modules disclosed are a hose module having fold-down chutes which lay the hose out alongside the truck as the truck moves ahead, and a tank module, which is coupled by quick-connect hoses to the intake and discharge lines of a pump carried in the truck bed. The intake and discharge lines of the pump may double as chassis rails for the truck. Also disclosed is a ladder carrier device which pivots downwardly and rearwardly to let the ladder slide down under its own weight after a sufficient length of the ladder has been pulled.

9 Claims, 7 Drawing Sheets

MODULAR FIRE TRUCK

BACKGROUND OF THE INVENTION

1. Field of the Invention

This invention relates to the art of vehicles.

More particularly, this invention relates to firefighting vehicles.

In a further and more specific aspect, the invention concerns a firefighting vehicles having a number of removable modules which are interchangeable for different applications.

2. Description of the Prior Art

The purpose of a firefighting vehicle, or fire truck, as it is more commonly called, is to transport firefighting equipment and personnel as quickly as possible from a fire station to the scene of a fire, often many miles away. Among the types of equipment which can be transported are tanks, pumps, hoses, ladders, communications devices, and rescue equipment. Over the years, as the science of firefighting has advanced, the equipment has become more and more specialized. The equipment needed for a chemical fire, for instance, would be very different from the equipment needed for a forest fire, and the equipment required for a high-rise apartment building would differ from that required for a vacant warehouse.

Just as fire equipment varies, so do the fire trucks which carry this equipment. Some firefighting companies may, in fact, own many different fire trucks, with each truck being reserved for a particular type of fire—one truck may be outfitted for situations involving toxic chemicals, another may be outfitted for rescue operations and so on. Smaller companies with limited budgets, on the other hand, are more likely to have just one or a few multi-purpose vehicles which can be used in any situation.

The multi-purpose types of vehicles may fall into one of two categories. One is a kind of "super truck", in which nearly all types of equipment are more or less permanently carried on the vehicle. This type of vehicle is generally quite expensive, heavy, and may be seen as wasteful, since it is inefficient to carry more equipment than necessary to any given fire. The other is a simpler type of truck in which only the most basic equipment such as pumps, tanks, hoses, and ladders are built-in or permanently carried, with some of the truck bed being empty. The rest of the equipment is normally stored separately in the fire station and only loaded onto the truck as needed. The main drawback with this type of truck is that much time may be wasted in searching for and loading the more specialized equipment when the occasion calls.

Another type of fire truck has been introduced, in which a single module is either slid on and off the truck bed as needed, or lifted on and off the bed with a crane. However, the single module lacks the versatility which is needed for fighting a large variety of different types of fires.

OBJECTS OF THE INVENTION

It would be highly advantageous, therefore, to remedy the foregoing and other deficiencies inherent in the prior art.

Accordingly, it is an object of the present invention to provide a modular fire truck with a number of interchangeable units suitable for different applications.

Another object of the invention is the provision of a conveyor system for loading equipment onto the bed of a fire truck.

And another object of the invention is to provide a removable tank module and dispensing system for loading on the bed of a fire truck.

Still another object of the invention is the provision of a removable hose module for laying out hose alongside a fire truck.

Yet another object of the invention is to provide an improved ladder carrier for a fire truck.

And yet a further object of the invention is the provision of fire truck modules, according to the foregoing, which are relatively inexpensive to manufacture and easy to use.

SUMMARY OF THE INVENTION

Briefly, to achieve the desired objects of the instant invention in accordance with the preferred embodiment thereof, a fire truck having a flat bed is provided with a conveyor system for loading a number of interchangeable firefighting modules onto the bed. The conveyor system comprises a frame carrying a number of rollers or casters which allow the units to be easily slid on and off the bed. Pneumatic, hydraulic, or mechanical means are provided for raising and lowering the roller frame to engage or disengage the flat bottoms of the firefighting modules.

One type of module usable with the truck is a hose module, which comprises a box containing a length of folded or coiled-up hose. Each side of the box includes a chute which folds down to dispense the hose alongside the truck as the truck moves forward.

Another type of module usable with the truck is a tank module having inlet and outlet ports which are coupled to the intake and discharge lines, respectively, of a pump built into the bed of the truck. Quick-connect couplings are used to couple the inlet and outlet ports to the intake and discharge lines of the pump, and a valve or valves are included for controlling flow into and out of the tank. The intake and discharge lines of the pump may also serve as chassis rails for the truck.

Also disclosed is a ladder carrying device which may be mounted on a conventional fire truck, as well as on the modular truck of the instant invention. The carrying device comprises an open-ended box defining an interior space for containing at least one ladder. Locking means are provided for gripping a rung of the ladder to prevent the ladder from sliding, and release means are provided for unlocking the grips. A pivoting connection allows the box to tilt downwardly toward the rear of the truck in response to the weight of the ladder when more than 50% of the length of the ladder has been pulled out. Counterbalancing means are also provided for preventing the carrier from tilting back too rapidly.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENT

Figure 1:
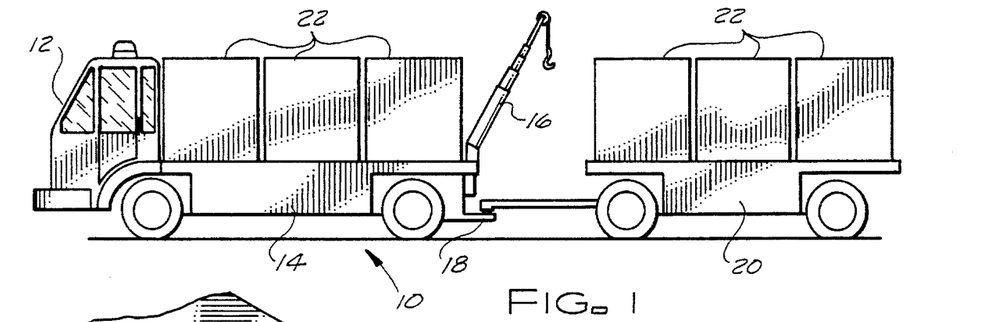
FIG. 1 is a side view showing a modular fire truck and trailer according to the present invention.

Turning now to the drawings in which like reference characters indicate corresponding elements throughout the several views, attention is first directed to FIG. 1, which shows a fire truck 10 according to the present invention. The truck 10 includes a cab 12, flat bed 14, rear hoist 16, and a hitch 18 for connection to a trailer 20. A number of modules 22 are carried on the bed 14 of the truck 10 for transport to the scene of a fire or other emergency. In the event that more modules are needed than can fit on the bed 14 of the truck, the trailer 20 can be loaded with additional modules, and towed behind the truck 10. Alternately, when fewer modules are needed, the trailer 22 can be disconnected from the truck 10, and left behind at the fire station.

Figure 2:
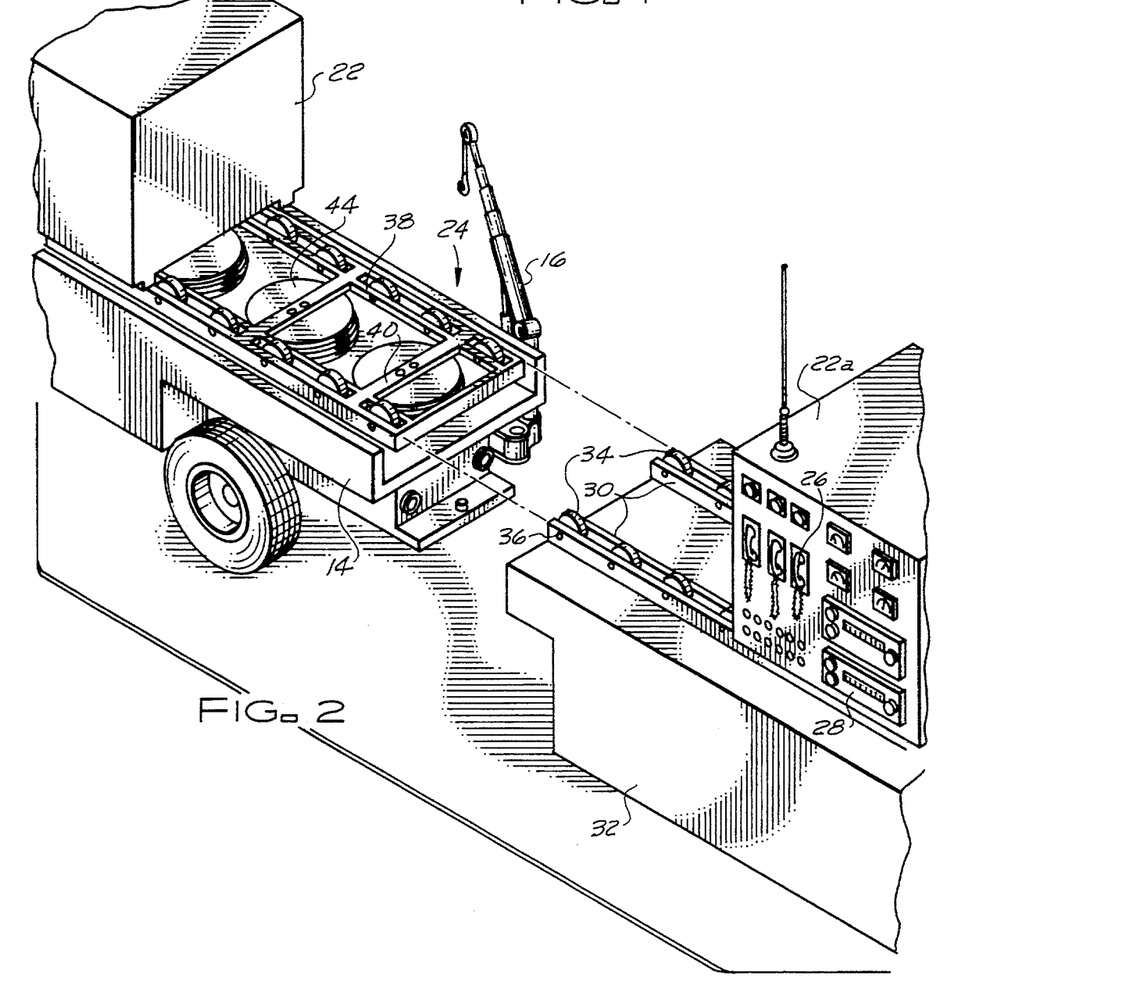
FIG. 2 is fragmentary perspective view showing the rear portion of the fire truck according to the present invention.

FIGS. 2–6 show a conveyor system 24 for easing movement of the modules 22 on and off the bed 14 of the truck 10. In the case of FIG. 2, the module of interest is a communications module 22a, containing phones 26, radios 28 and other electronic equipment, which is positioned atop a pair of roller rails 30 on a stationary platform 32 in the fire station. The roller rails 30 comprise a pair of steel channels, each channel containing a plurality of cylindrical wheels or rollers 34. Each roller is mounted for rotation about an axle 36 extending transverse to the direction of the channels.

Figures 3, 4:
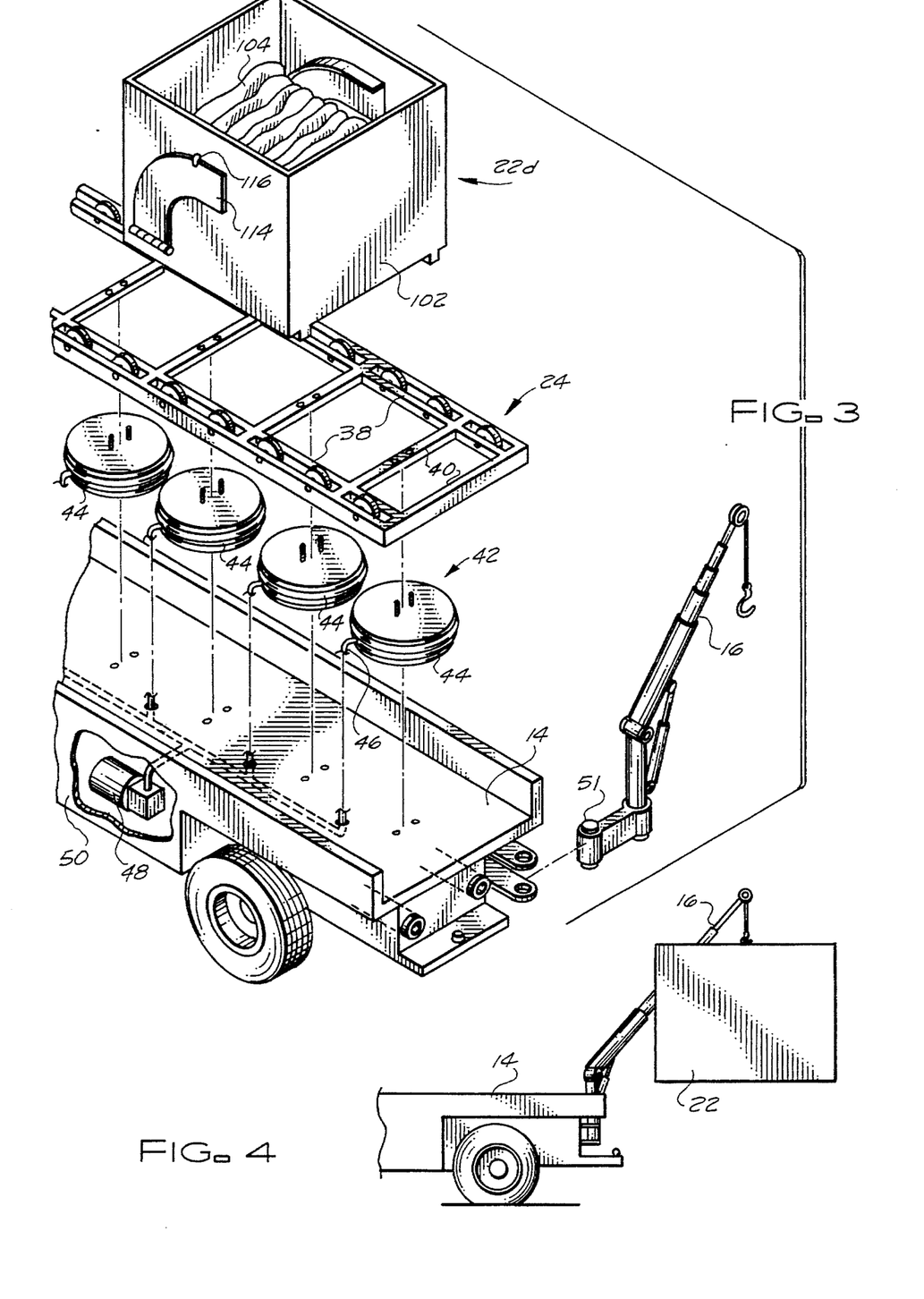
FIG. 3 is an exploded, fragmentary perspective view showing the rear of the fire truck and a hose module according to the present invention.
FIG. 4 is a fragmentary side view showing a module being hoisted onto the fire truck of the present invention.
Figure 5:
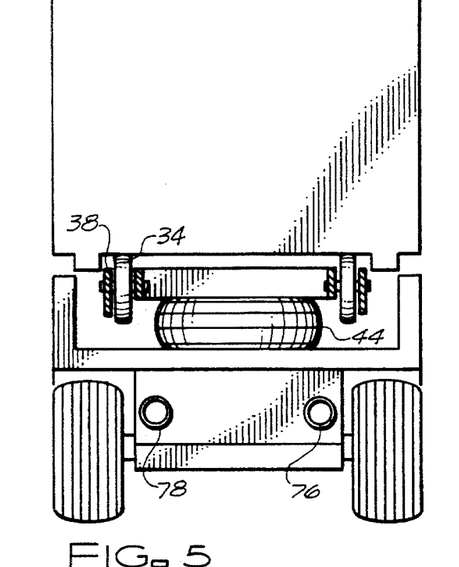
FIG. 5 is a rear view showing the fire truck of the present invention, with the roller frame in a raised position.
Figure 6:
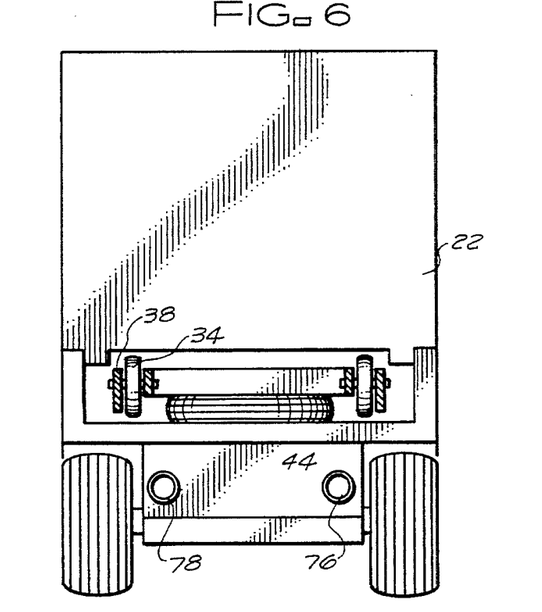
FIG. 6 is a rear view similar to FIG. 5, with the roller frame in a lowered position.

As can best be seen in FIG. 3, the conveyor system 24 includes a pair of roller rails 38, which are generally similar to the roller rails 30 on the platform 32. The roller rails 38 are joined to one another by a number of cross bars 40, each of which is secured to a height adjustment mechanism 42 in the bed of the truck. In this embodiment, the height adjustment mechanism 42 comprises a set of inflatable air bags 44 carried in the truck bed 14. The air bags 44 are coupled by means of air hoses 46 to an air pump or compressor 48, which may located in either the chassis 50 or the cab 12 of the fire truck 10. Inflation of the air bags 44 causes the roller rails 38 to rise into engagement with the bottom of a module 22, as shown in FIG. 5, while deflation of the air bags 44 causes the roller rails 38 to drop to a non-use position, as shown in FIG. 6.

To load a module 22 on to the bed 14 of the fire truck 10, it is simply necessary to back the truck 10 against the platform 32 and to elevate the roller rails by inflating the air bags 44 until the roller rails 38 are aligned with the roller rails 30 on the platform 32. Then, the module 22 is pushed forwardly along the roller rails 34, 38, until it reaches the desired position on the truck bed 14. The air bags 44 are then deflated, moving the roller rails 38 out of engagement with the bottom of the module 22, so the module will not slide off the truck bed 14 when the truck is in motion.

The air bags 44 are preferably independently controllable of one another to allow tilting of the roller rails 38. For instance, by inflating the air bags closest to the cab 12 more than the air bags in the rear of the bed 14, an operator could cause the roller rails 38 to tilt "downhill" toward the rear of the truck 10, making it easier to off load modules 22 on to the platform. Conversely, the air bags could be used to straighten the rails 38 in cases where tilt is undesirable—for instance, when the weight of a single module causes the roller frame 38 to tilt away from the platform 32, making it difficult to load additional modules.

Also a part of the conveyor system 24 is the hoist 16, which can be used to lift modules on and off the truck bed 14, as shown in FIG. 4. This is useful for applications in which simple sliding on and off the roller frames is not expedient. The hoist 16 is secured to the rear of the truck 10 by means of a swivel mount 51, which allows the hoist 16 to be swung to one side, allowing the truck 10 to be loaded from the rear.

Figure 16:
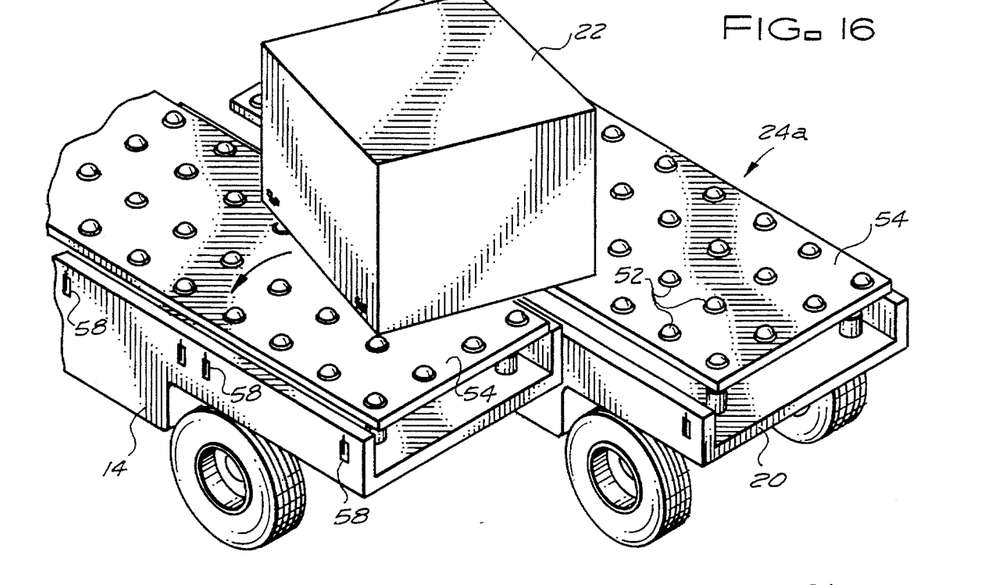
FIG. 16 is a fragmentary perspective view showing an alternate roller frame for the back of the truck.
Figure 17:
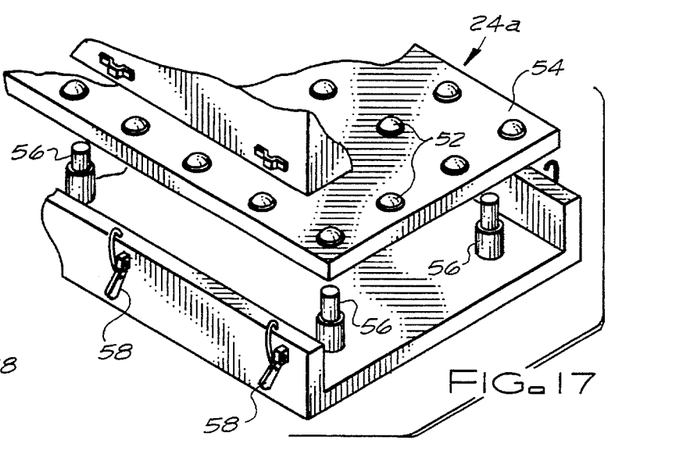
FIG. 17 is a fragmentary, exploded perspective view showing the alternate roller frame of FIG. 16.

An alternate conveyor system 24a is illustrated in FIGS. 16–19. Here, the roller rails 30, 38 on the truck 10 and loading platform 32 or trailer 20 of the previous embodiment have been replaced with a plurality of spherical rollers 52 carried within a roller plate 54. The rollers 52 are mounted for rotation in all directions. Thus, the bed 14 can be loaded not only from the rear, but from the side, as well, as shown in FIG. 16. Side loading is, in fact, preferable to rear loading in most cases, since it eliminates the need to provide a swivel mount for the hoist 16 (not seen in FIG. 16), and allows for more than one module to be loaded at a time.

Also shown in FIGS. 16–19 is an alternate height adjustment mechanism, in which the air bags 44 of the previous embodiment are replaced by a number of hydraulic pistons 56. Other lifting mechanisms, such as electric or hand-operated jacks, could also be used.

Figure 18:
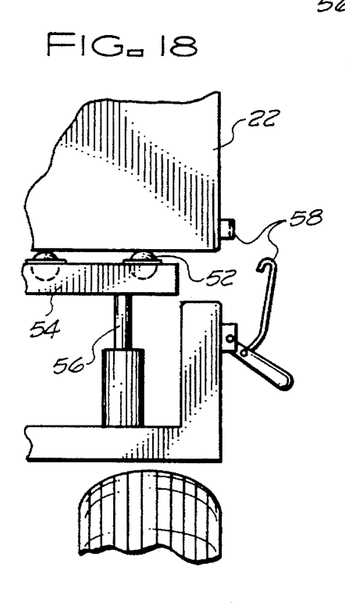
FIG. 18 is a fragmentary side view showing the roller frame of FIGS. 16 and 17 in a raised position.
Figure 19:
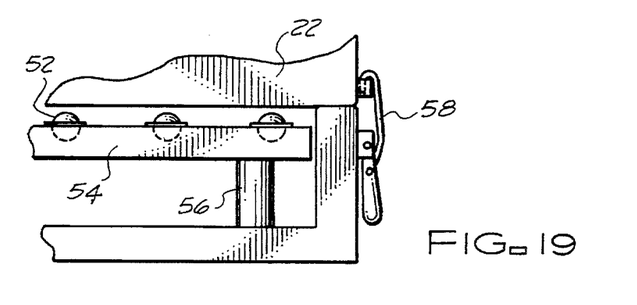
FIG. 19 is a view, similar to FIG. 18, showing the roller frame in a lowered position.

FIG. 18 shows the height adjustment mechanism in a raised position. The pistons 56 are fully extended, forcing the spheres 52 of roller plate 54 into engagement with the bottom of the module 22. FIG. 19 shows the height adjustment mechanism in a lowered, or non-use, position. The pistons 56 are retracted, lowering the spheres away from the bottom of the module 22. A number of cooperating latch elements 58 are provided along the upper edge of the truck bed 14 and the lower edge of each module, so that the modules can be securely fastened to the bed 14 when the height adjustment mechanism has been lowered. This ensures that the modules will remain steady on the bed 14 when the truck 10 is in motion.

Figure 7:
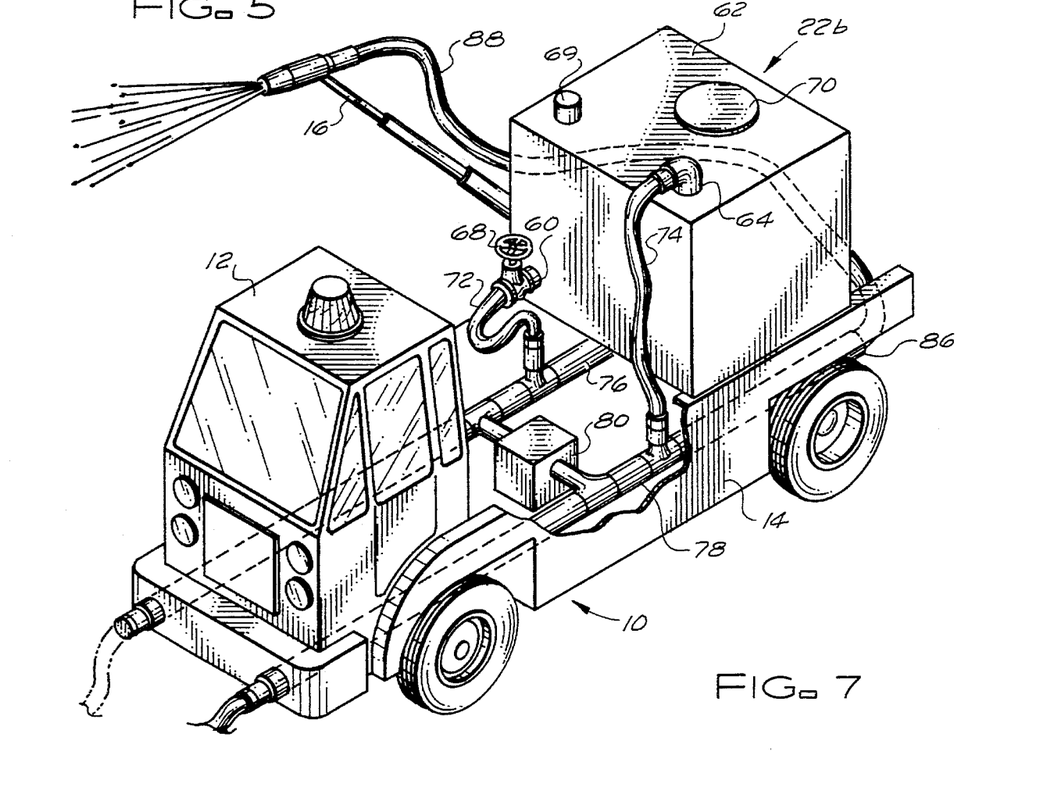
FIG. 7 is a perspective view, with portions broken away, of the fire truck and a tank module according to the present invention.

A tank module 22b usable with the truck 10 of the present invention is shown in FIG. 7. The tank module 22b consists of a tank 62 having an inlet port 64 for receiving water or other firefighting fluids and an outlet port 66 for discharging the same. A valve 68 at the outlet port 66 controls the flow from the tank 62. Also included are a vent valve 69 and a lidded observation and fill port 70.

The inlet and outlet ports 64, 66 of the tank 62 are coupled by means of flexible, quick-connect hoses 72, 74 to the intake and discharge lines, 76, 78, respectively, of a pump 80, which may be embedded in the floor of the truck bed 14 or carried in the cab 12 or elsewhere. The intake and discharge lines 76, 78 are preferably made of sufficiently thick, strong, corrosion resistant material to enable them to serve as chassis rails for the fire truck 10.

The outlet end 86 of the discharge line 78 projects through the rear of the vehicle and is connected to a nozzled fire hose 88 used to direct liquid at the flames of a fire. The hoist 16 of the fire truck 10 may be used to support and direct the fire hose 88 in situations where it would be dangerous for personnel to approach the fire too closely, or where the added height advantage can be used.

Figures 8, 9:
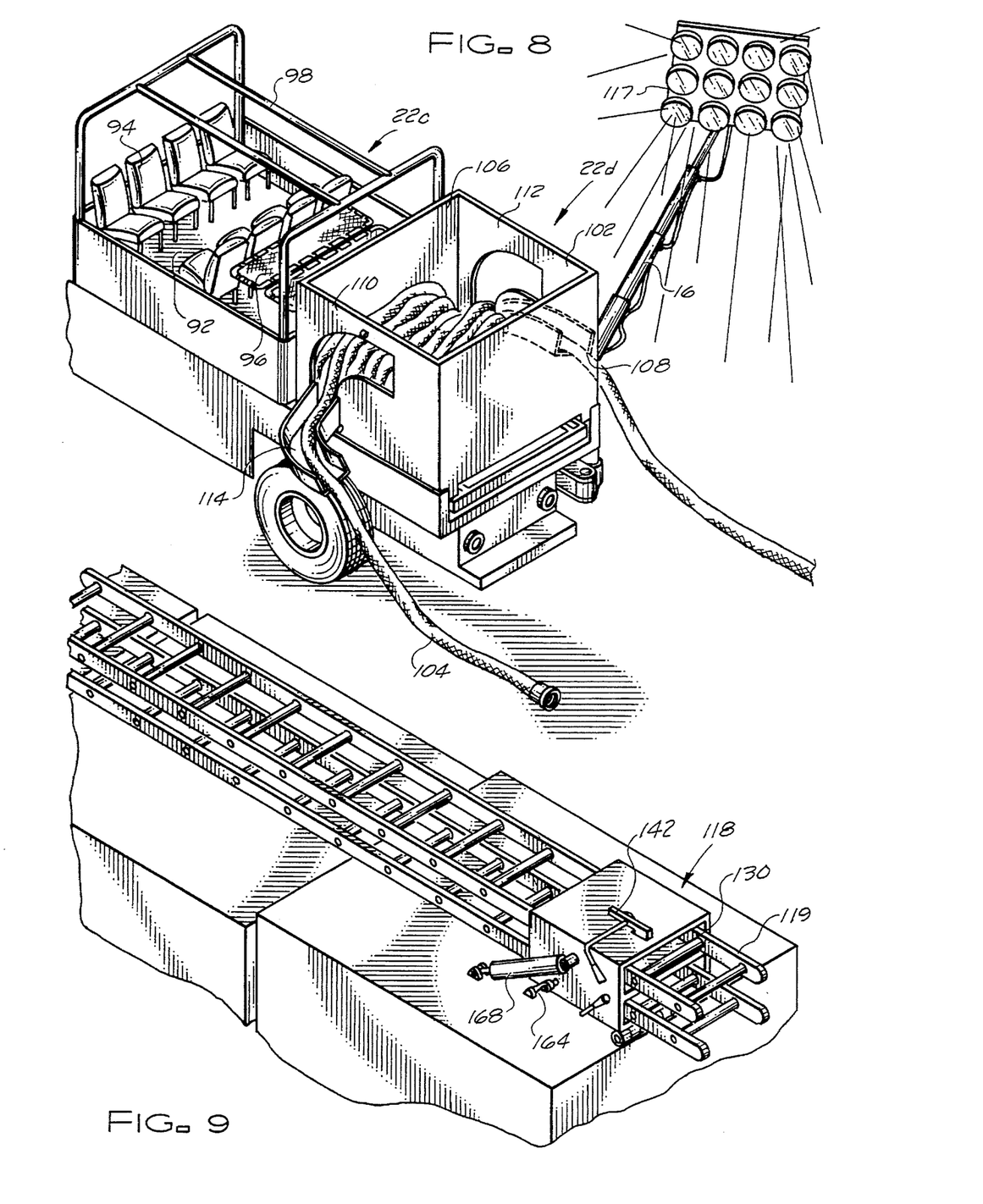
FIG. 8 is a fragmentary perspective view showing the rear portion of the fire truck of the present invention, with hose and personnel modules.
FIG. 9 is a fragmentary perspective view showing a ladder carrying device usable with the fire truck of the present invention.
Figure 10:
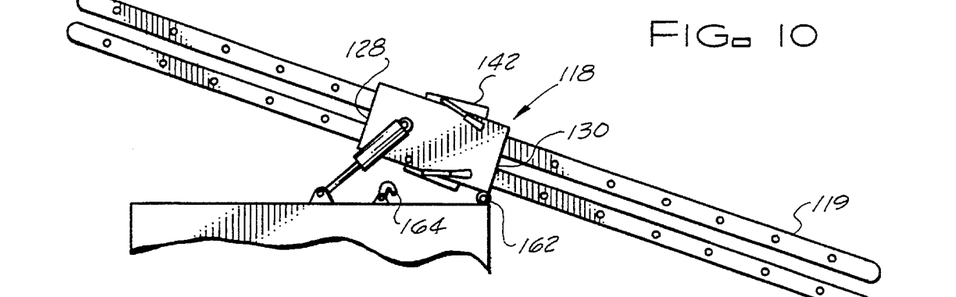
FIG. 10 is a fragmentary side view showing the ladder carrying device of FIG. 9 in a tilted position.
Figures 11, 12:
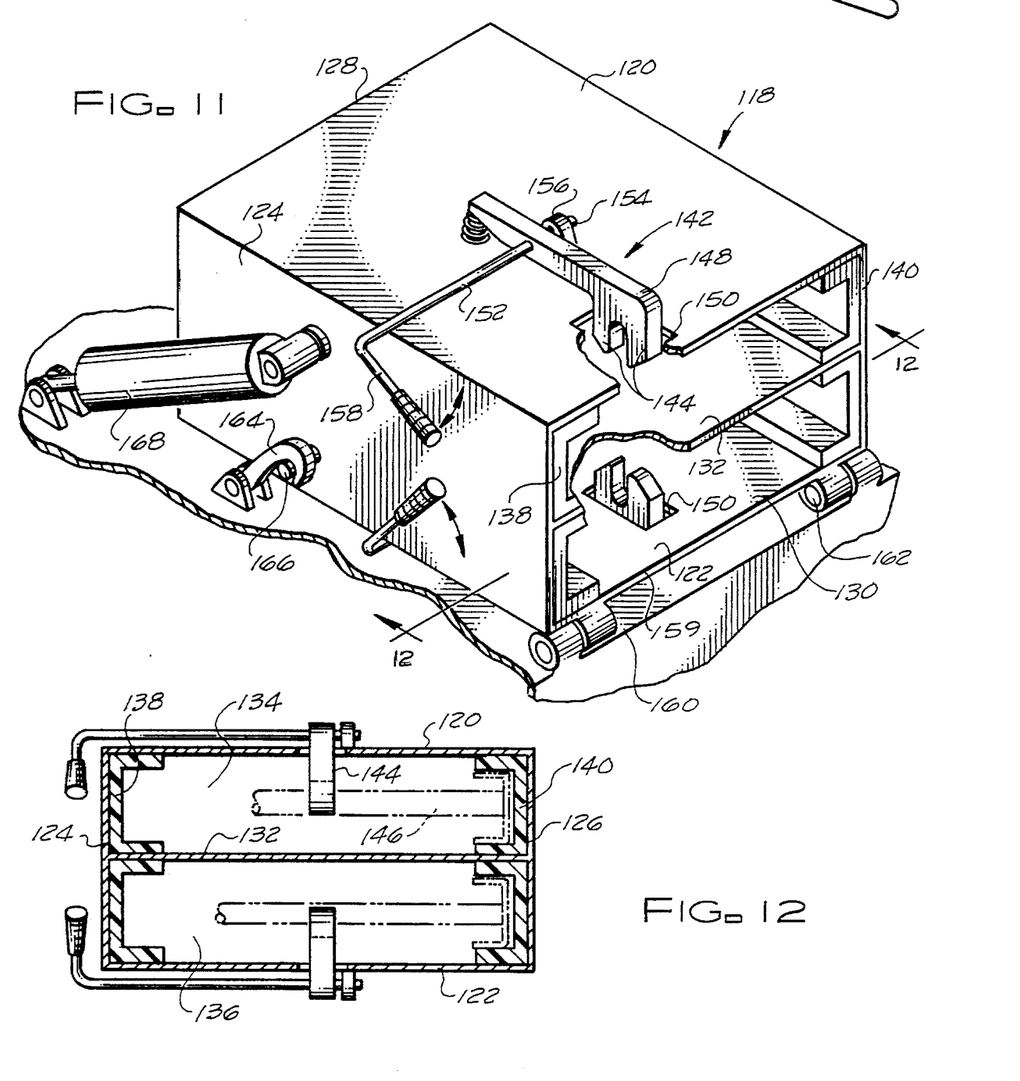
FIG. 11 is an enlarged fragmentary view showing the ladder carrying device of FIG. 9.
FIG. 12 is a sectional view taken through line 12—12 of FIG. 11.

FIG. 8 shows two additional modules which may be provided in conjunction with the fire truck 10 of the present invention. A personnel module 22c comprises a flat platform 92 carrying a number of benches or seats 94 for the firefighters, and having enough floor space to hold stretchers 96 or other equipment. Roll bars 98 are provided overhead for protecting the firefighters in the event of an accident.

A hose module 22d, also seen in FIG. 3, comprises a flat-bottomed box 102 containing a length of coiled or folded hose 104. The box 102 includes a front wall 106, a rear wall 108, and a pair of side walls 110, 112, which extend along the sides of the truck 10. A fold-down chute 114 is provided in each side wall 110, 112. When pivoted down, the chutes 114 allow a length of hose 104 to be dispensed alongside the truck in a straight, untangled fashion as the truck moves forward. When folded back up, the chutes 114 preferably lie flush against the sidewalls 110, 112. A latch 116 is provided for locking the chutes 114 in the folded up position.

FIG. 8 also shows an additional use for the truck's hoist 16. When a panel of lights 117 is mounted on the hoist 16, a convenient light tower is created for use when visibility is poor.

FIGS. 9–12 illustrate a device 118 for carrying ladders 119. The device 118 may be a part of a module on the truck 10 of the present invention, but also could be part of a permanent structure such as a post or roof of a conventional fire truck. The carrier device 118 is a box comprising a top wall 120, bottom wall 122, and side walls 124, 126. The front and back ends 128, 130 of the box are open. A horizontal partition plate 132 divides the interior of the box into two compartments 134, 136, each for containing a ladder. A larger box having more compartments can also be used to carry more than two ladders. C-shaped channels 138, 140 are provided along the inner side walls of each compartment, for slideably receiving the ladders 119. The channels 138, 140 and other portions of the box interior may be formed of, or coated with, a low-friction material such as TEFLON® (polytetrafluoroethylene)to facilitate the sliding motion of the ladders.

A gripping mechanism 142 is provided for preventing the ladders 119 from slipping when in storage. The gripping mechanism 142 comprises a pair of fingers 144 configured to grasp a rung 146 of the ladder 119. The fingers 144 depend from a bar 148 mounted for pivoting movement on the carrier box 118, and extend through openings 150 on the top and bottom walls 120, 122 of the box. The bar 148 is secured to a shaft 152 having a first end 154 rotatably carried in a tab or bearing 156 projecting from the box 118, and a second end 158 which is bent at 90° to form a lever for operating the mechanism 142.

The lower rear edge 159 of the carrier box 118 is secured to the upper rear edge 160 of the truck or module by hinges 162 which allow the box 118 to tilt. When the ladders 119 are in storage, the box 118 is prevented from tilting by a hook 164, the hooked end of which cooperates with a pin 166 projecting from a side of the box 118, and the straight end of which is pivotably secured to the top of the truck or module. When the hook 164 is released, the rate of tilting is retarded by a pneumatic shock 168 having one end pivotably secured to the truck or module and another end secured to a side wall of the box 118, at a point intermediate the front and rear ends 128, 130.

To remove a ladder from the carrier device 118, an operator merely releases the gripping mechanism 142 and the hook 164 and pulls the ladder out the rear end 130 of the box 118. Once more than 50% of the length of the ladder has been pulled out of the box 118, the weight of the ladder causes the box 118 to tilt toward the rear, thus allowing the ladder 118 to slide right out.

FIGS. 13–16 show an alternate arrangement for securing the carrier device 118 to the truck or module. Instead of being hinged, the carrier device 118 is provided with a pair of pivot pins 170 (only one shown) which extend laterally from the lower front corners 172 of the device 118. The outer end of each pin 170 is rotatably carried in an upper front corner of a plate 174, which is slideably carried in a channel 176 secured to the top surface of the truck or module. The channel runs in a rearward direction from a point intermediate the front and rear ends of the truck or module, and terminates at the rear edge thereof. A heavy-duty spring 178 extends from the upper front corner of the slideable plate 174 to an upper front corner of the carrier box.

Figures 13, 14, 15:
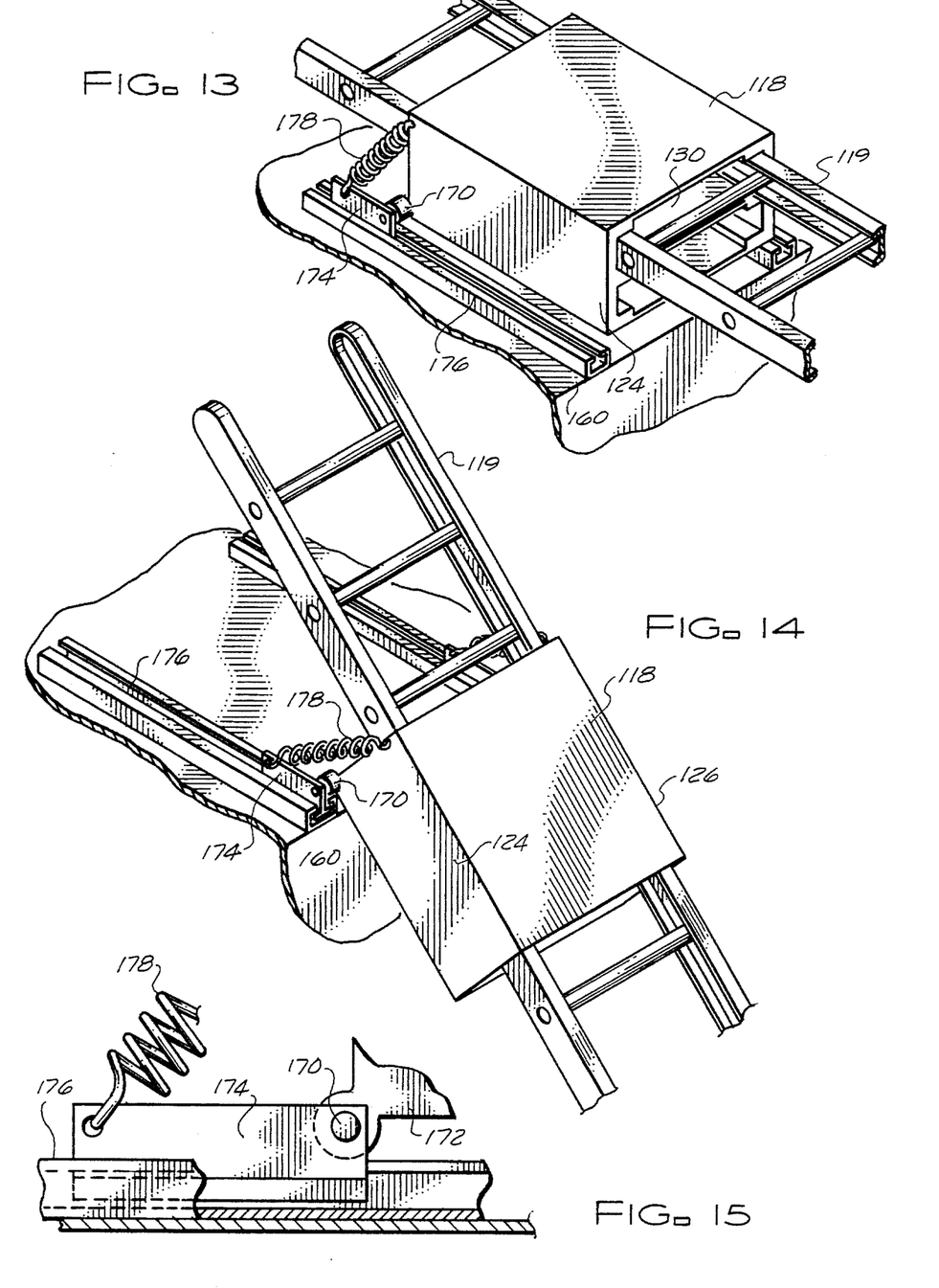
FIG. 13 is a fragmentary perspective view showing an alternate embodiment of the ladder carrying device.
FIG. 14 is a view, similar to FIG. 13, showing the ladder carrying device in a tilted position.
FIG. 15 is a fragmentary side view showing a detail of the slidable pivot mechanism of FIGS. 13 and 14.

When the ladders are in storage, the slideable plate 174 rests at the front end of the channel, and the carrier box 118 is in a horizontal position on top of the truck. When a ladder is to be removed, the operator pulls it out the open rear end 130 of the box 118, as in the previous embodiment. When a sufficient portion of the ladder 119 has been pulled out, its weight causes the slideable plate 174 to slide towards the rear of the channel, and the box 118 to move axially toward the rear of the truck. Once the rear edge 160 has been reached, the pivot pins 170 rotate in the plates 174, causing the box 118 to tilt down over the edge 160, and the ladder 119 to slide out. Since this arrangement allows the box 116 to tilt at a steeper angle than the arrangement of the previous embodiment, it is especially suitable for use on higher fire trucks.

Other modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A fire truck comprising:
   a) a cab having a front and a rear;
   b) a flat bed to the rear of said cab, said bed having a predetermined length and including a pair of elongated sides and a floor;
   c) a plurality of removable, interchangeable modules containing individual firefighting systems, including at least one tank module containing a liquid for extinguishing a fire;
   d) conveyance means for facilitating movement of said modules on and off said bed;
   e) a pump intake line extending through the length of said bed;
   f) a pump discharge line extending through the length of said bed;
   g) flexible fluid coupling means for connecting said tank module to said intake and discharge lines; and
   h) valve means coupled to said tank module for regulating flow between said tank module and said intake and discharge lines;
   wherein said intake and discharge lines are chassis rails for truck.

2. A fire truck according to claim 1, wherein said conveyance means comprises a plurality of rollers mounted on said bed.

3. A fire truck according to claim 2, wherein said conveyance means comprises height adjustment means for shifting said rollers mounted on said bed.

4. A fire truck according to claim 3, wherein said height adjustment means comprises:
   a) at least one air bag disposed beneath said rollers; and
   b) inflation means in said bed for inflating and deflating said air bag.

5. A fire truck according to claim 2, wherein said conveyance means further includes a crane for lifting said modules on and off said bed.

6. A fire truck according to claim 1, wherein said flexible coupling means comprises a pair of quick-connect hoses.

7. A fire truck comprising:
   a) a cab having a front and a rear;
   b) a flat bed to the rear of said cab, said bed including a pair of elongated sides and a floor;
   c) a plurality of removable interchangeable modules containing individual firefighting systems, including at least one hose module, said hose module comprising
      i) a floor portion,
      ii) a wall portion projecting upwardly from said floor portion, said floor and wall portions defining a chamber for containing the hose, said wall portion including right and left sides extending along the sides of the truck bed, and
      iii) chute means, pivotably carried in said right and left sides of said wall portion, for folding downwardly to expel a portion of said hose along either side of said hose module as said truck proceeds; and
   d) conveyance means for facilitating movement of said modules on and off said bed, said floor portion engaging said conveyance means.

8. A fire truck according to claim 7, wherein said chute means folds upwardly to a position flush with said wall portion when not in use.

9. A fire truck according to claim 8 further comprising latch means for locking said chute means in said flush position.

* * * * *